United States Patent [19]

Carnahan

[11] 4,411,561
[45] Oct. 25, 1983

[54] SPRING FEEDING DEVICE

[75] Inventor: John T. Carnahan, Fairborn, Ohio

[73] Assignee: Emerson Electric Company, St. Louis, Mo.

[21] Appl. No.: 266,566

[22] Filed: May 22, 1981

[51] Int. Cl.³ .................................. B65G 51/02
[52] U.S. Cl. ........................... 406/137; 198/953; 221/200
[58] Field of Search ............... 198/953; 406/134, 137; 209/625; 221/200, 278; 222/148, 196

[56] References Cited

U.S. PATENT DOCUMENTS 3,625,570 12/1971 Ford .............................. 198/953 X
4,214,844 7/1980 Cockayne ..................... 198/953 X
4,215,954 8/1980 George et al. ................. 198/953 X

OTHER PUBLICATIONS

Wikkle Tool & Manufacturing Co., Inc.'s Spring Untangling Device.

Primary Examiner—Jeffrey V. Nase
Attorney, Agent, or Firm—Biebel, French & Nauman

[57] ABSTRACT

A device for supplying helical wire compression springs in sequence to an output conduit includes a casing defining a spring supply chamber therein for receiving a plurality of helical wire compression springs of a first diameter. A delivery tube is mounted on top of the casing and defines a spring outlet opening of a diameter slightly larger than the first diameter. The delivery tube communicates, through the spring outlet opening, between the chamber and the output conduit. An agitator, including an air inlet communicating with the bottom of the chamber, supplies air under pressure to the chamber such that springs in the chamber are agitated, and pass out of the chamber through the delivery tube and into the output conduit. A shedder piston surrounds the spring outlet opening of the delivery tube, and moves with respect thereto so as to dislodge springs entangled within or blocking the spring outlet opening.

6 Claims, 8 Drawing Figures

SPRING FEEDING DEVICE

BACKGROUND OF THE INVENTION

The present invention relates to a spring supply device and, more particularly, to a pneumatically operated device for supplying helical wire compression springs in sequence to an output conduit such that the springs may then be conveyed to a remote assembly station.

Helical wire coil compression springs are typically purchased in bulk by manufacturers for use in assembling numerous types of products. The springs are supplied to the manufacturer in containers containing hundreds or even thousands of such springs. The springs in the containers are jumbled and a number of the springs may be tangled or interlocked. It will be appreciated that automatically providing the springs in sequence to a supply conduit for transport to a dispensing device at an assembly station presents a significant problem.

One approach to this problem has been to place the springs in a container having an air inlet in its bottom and a spring outlet opening in its top which communicates with the supply conduit. Air is supplied under pressure to the air inlet and agitates the mass of springs in the container, causing them to move in a random fashion. The spring outlet opening in the top of the container has a diameter only slightly larger than the diameter of the helical coil springs. The random motion of the springs cause various ones of them to enter the outlet opening. Air leaving the chamber through the outlet opening transports the springs to the supply conduit. In the operation of such a device, it is common that a first spring will enter the spring outlet opening only partially and will thereafter be precluded from further movement out of the chamber by a second spring which is interlocked or tangled with the bottom of the first spring. As a consequence, the spring outlet opening will become clogged and further supply of springs to the output conduit will be prevented.

In one prior art device, such clogging is periodically cleared by reversing the direction of air flow. A short pulse of air is forced down the spring outlet opening and into the chamber to dislodge the spring or springs blocking the spring outlet opening. When the springs are tightly wedged in the opening, however, such a pulse of air may not be sufficient to clear the opening, since the springs are formed of thin wire material and offer little air resistance.

Accordingly, it is seen that there is a need for a spring detangler and feeder device in which blockage of the spring outlet opening may be more efficiently cleared.

SUMMARY OF THE INVENTION

A device for supplying helical wire compression springs in sequence to an output conduit includes casing means defining a spring supply chamber therein for receiving a plurality of helical wire compression springs of a first diameter. A delivery tube is mounted on top of the casing and defines a spring outlet opening of a diameter slightly larger than the first diameter. The delivery tube communicates through the spring outlet opening between the chamber and the output conduit. An agitator means, including an air inlet communicating with the bottom of the chamber, is provided for supplying air under pressure to the chamber such that springs in the chamber are agitated and passed out of the chamber through the delivery tube and into the output conduit. A shedder piston means surrounds the spring outlet opening of the delivery tube and is movable with respect to the delivery tube so as to dislodge springs entangled within or blocking the outlet opening.

The shedder piston means may comprise a shedder piston surrounding the delivery tube and movable with respect thereto, and spring means biasing the piston upward into a dispensing position in which the lower end of the piston surrounds the spring outlet opening. The device may further include pneumatic supply means for supplying air under pressure to the top of the shedder piston to cause the piston to move downward from the dispensing position so as to dislodge springs blocking the spring outlet opening of the delivery tube, and for supplying air under pressure to the air inlet.

The delivery tube may define a beveled exterior surface surrounding the spring outlet opening and the shedder piston may define an internally beveled surface. The clearance between the externally beveled surface and the internally beveled surface when the shedder piston is in its dispensing position is less than the thickness of the wire forming the helical springs. As a consequence, a spring cannot become lodged between the externally beveled surface and the internally beveled surface when the shedder piston is in its dispensing position.

The top of the chamber is defined by surfaces converging toward the spring inlet such that springs which strike the top of the chamber are deflected toward the spring outlet opening. Similarly, the chamber has a downwardly converging, generally conical floor. The agitator means includes a deflector for directing air from the air inlet along the floor, whereby springs in the chamber are thoroughly agitated.

The pneumatic supply means includes a pressurized air supply source and means for directing air from the supply source to the air inlet for a selected portion of an operating cycle of the device, and for directing air to the top of the shedder piston for the balance of the operating cycle of the device. A means for repetitively interrupting the supply of air to the top of the shedder piston is provided whereby the shedder piston repeatedly moves downward from the dispensing position.

Accordingly, it is an object of the present invention to provide a means for detangling and feeding coil springs of the closed end compression type from a chamber to an output conduit. A further object of the invention is to provide a more flexible and reliable pneumatic control circuit. Still another object of the invention is to provide a new and more positive means of ejecting multiple or entangled springs from the outlet of the device. An additional object of the invention is to provide an improved means for filling the device without the use of hand tools or the removal of any components of the device to accomplish the filling or replenishing of the springs. A still further object of the invention is to provide an improved air inlet arrangement at the bottom of the container of the device to obviate the occurrence of voids or pockets in the supply of springs. Still another object of the invention is to provide an improved and simplified means whereby the device can be quickly converted to detangle and feed other springs of totally different dimensions within a predetermined size range. Yet another object of the invention is the substantially reduced consumption of compressed air required to operate the device as compared with similar type apparatus.

DETAILED DESCRIPTION OF THE PREFERRED EMBODIMENTS

Figure 2:
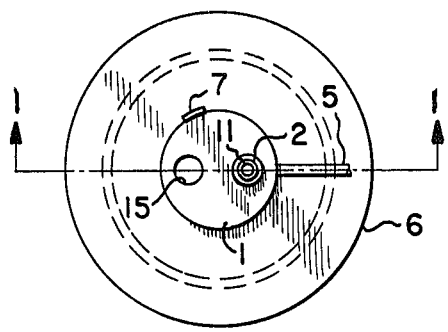
FIG. 2 is a plan view of the device of the present invention.
Figure 1:
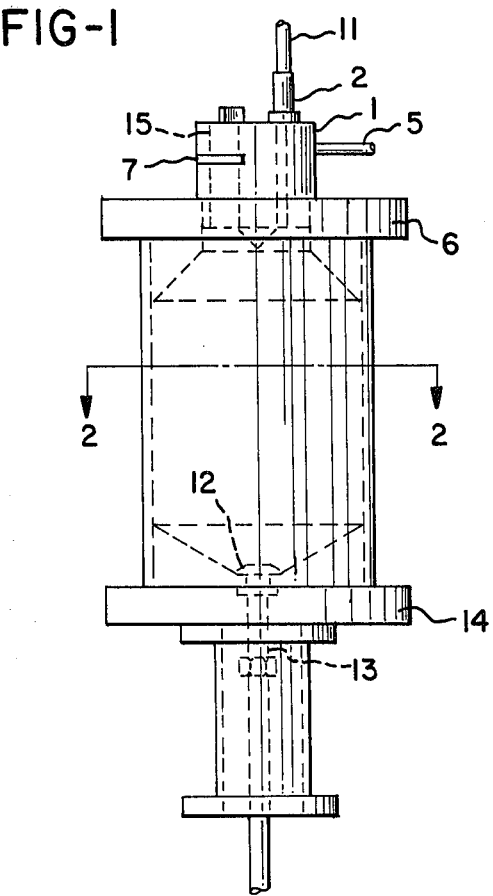
FIG. 1 is a front view of the device of the present invention.
Figure 4:
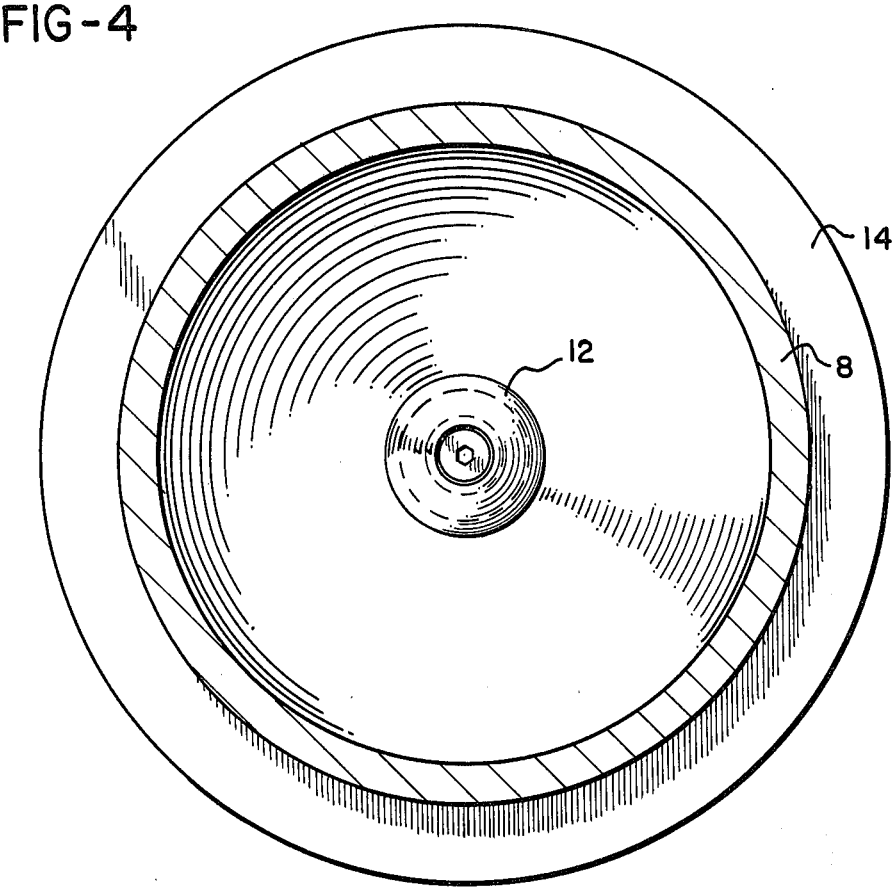
FIG. 4 is a sectional view, taken generally along line B—B in FIG. 1.
Figure 3:
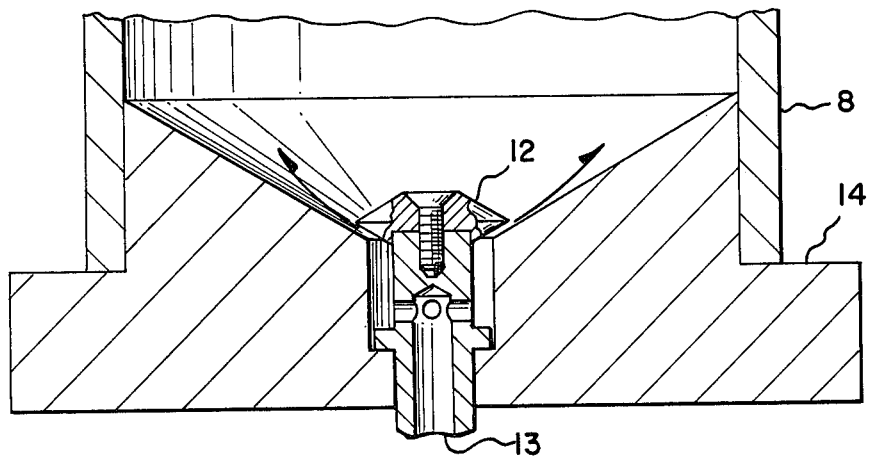
FIG. 3 is a partial sectional view of the lower portion of the casing, taken generally along line A—A in FIG. 2.
Figure 6:
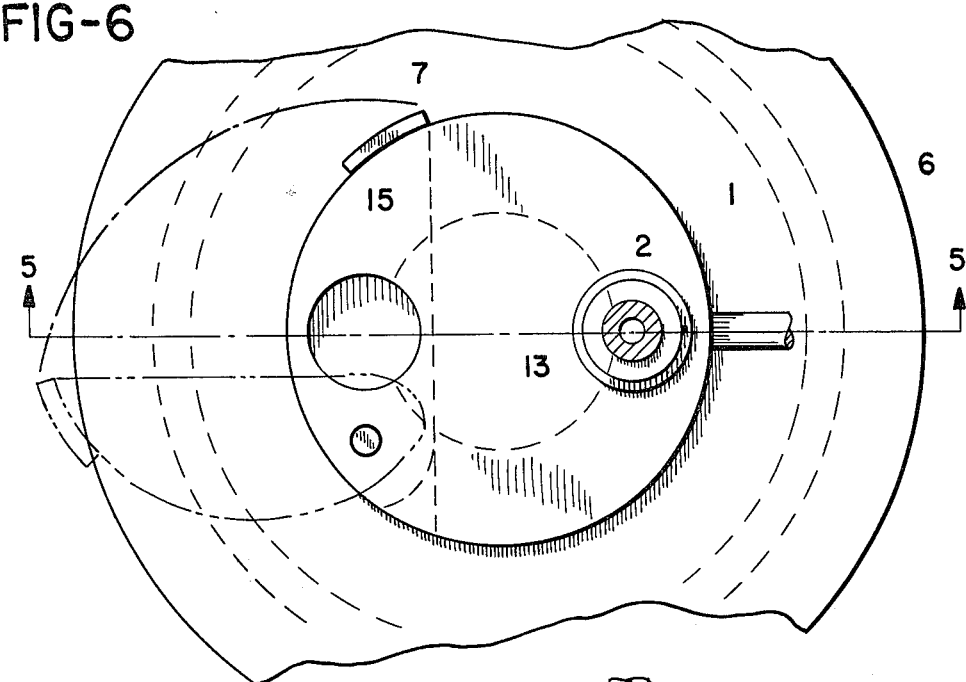
FIG. 6 is a plan view, with the output conduit in section, taken generally along line C—C in FIG. 5.
Figure 5:
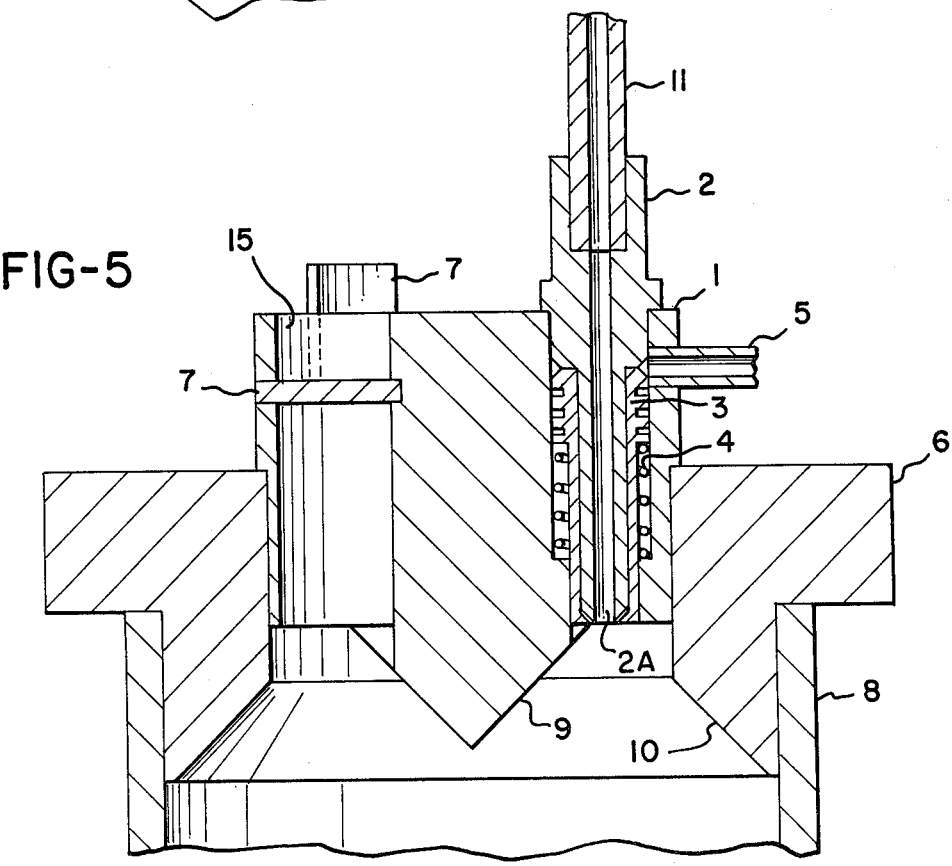
FIG. 5 is a partial sectional view, taken generally along line A—A in FIG. 2, showing the upper portion of the device.
Figure 7:
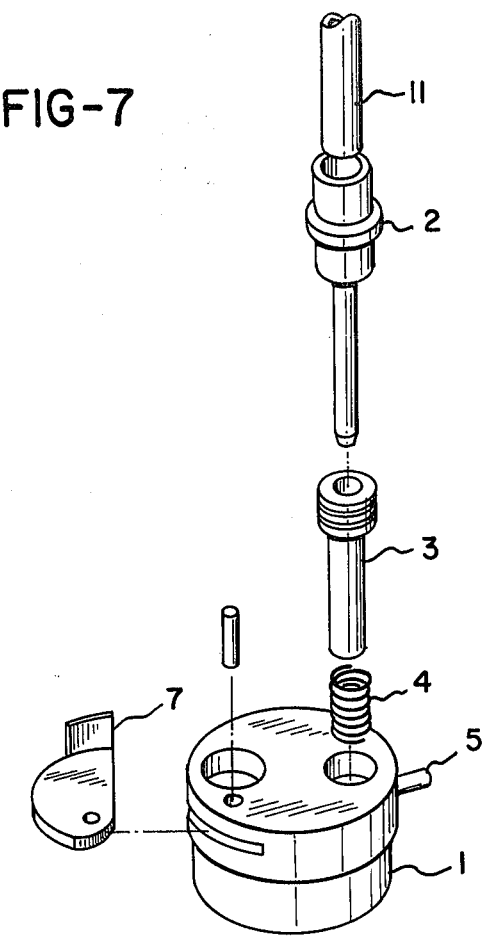
FIG. 7 is an exploded perspective view of the upper portion of the device.

Reference is made to FIGS. 1-7 which illustrate a device constructed according to the present invention. Compressed air from the pneumatic control is directed via tube 5 to the top of the shedder piston 3 which surrounds the delivery tube 2 at the top of the cylinder 8. This causes the shedder piston to move downward. The internally beveled tip of the shedder piston 3 and the externally beveled tip of the delivery tube 2 are very closely matched, with a predetermined clearance between these beveled surfaces so that wire springs are not caught therebetween.

The air supplied to the shedder piston 3 is pulsated by the pneumatic control and consequently causes the shedder piston 3 to oscillate vertically, with the shedder piston 3 being retracted after each pulse by return spring 4. When the shedder piston 3 moves downward, the sharply beveled lower end pulls or extracts entangled springs from the spring outlet opening 2A of the delivery tube 2 where they have become lodged from the previous cycle. The springs then fall to the bottom of the chamber.

The pneumatic control terminates the flow of air to the shedder piston 3 after several pulses and shifts the flow to the air inlet 13 at the lower end of the cylinder 8 where it is dispersed 360° around the deflector 12 as indicated by the arrows (FIG. 3) which causes the springs resting in the conical portion of the lower cap 14 to be agitated and circulated throughout the interior chamber of the casing 8 in a random, thereby untangling a portion of them. Since the only air outlet from the chamber is through the delivery tube 2 at the top of the casing 8, some springs, aided by the direction of the conical surfaces 9 and 10, being a part of the cap assembly 6 and piston housing 1 respectively, are carried or blown through the spring outlet opening 2A and carried by output conduit 11 to a dispenser or other device.

The pneumatic control now terminates the air flow to the air inlet 13 and completes the cycle. The pneumatic control can be adjusted to initiate the cycle just described immediately or remain idle for an extended period of time, depending on the spring feed rate required.

Also located in the piston housing 1 is a filling aperture 15, and a closure 7 which may be swung open to permit filling the chamber with a quantity of springs. In order to convert the device to detangle and feed springs of a different diameter, it is only necessary to replace the delivery tube 2 and shedder piston 3 with appropriately sized replacement parts.

Figure 8:
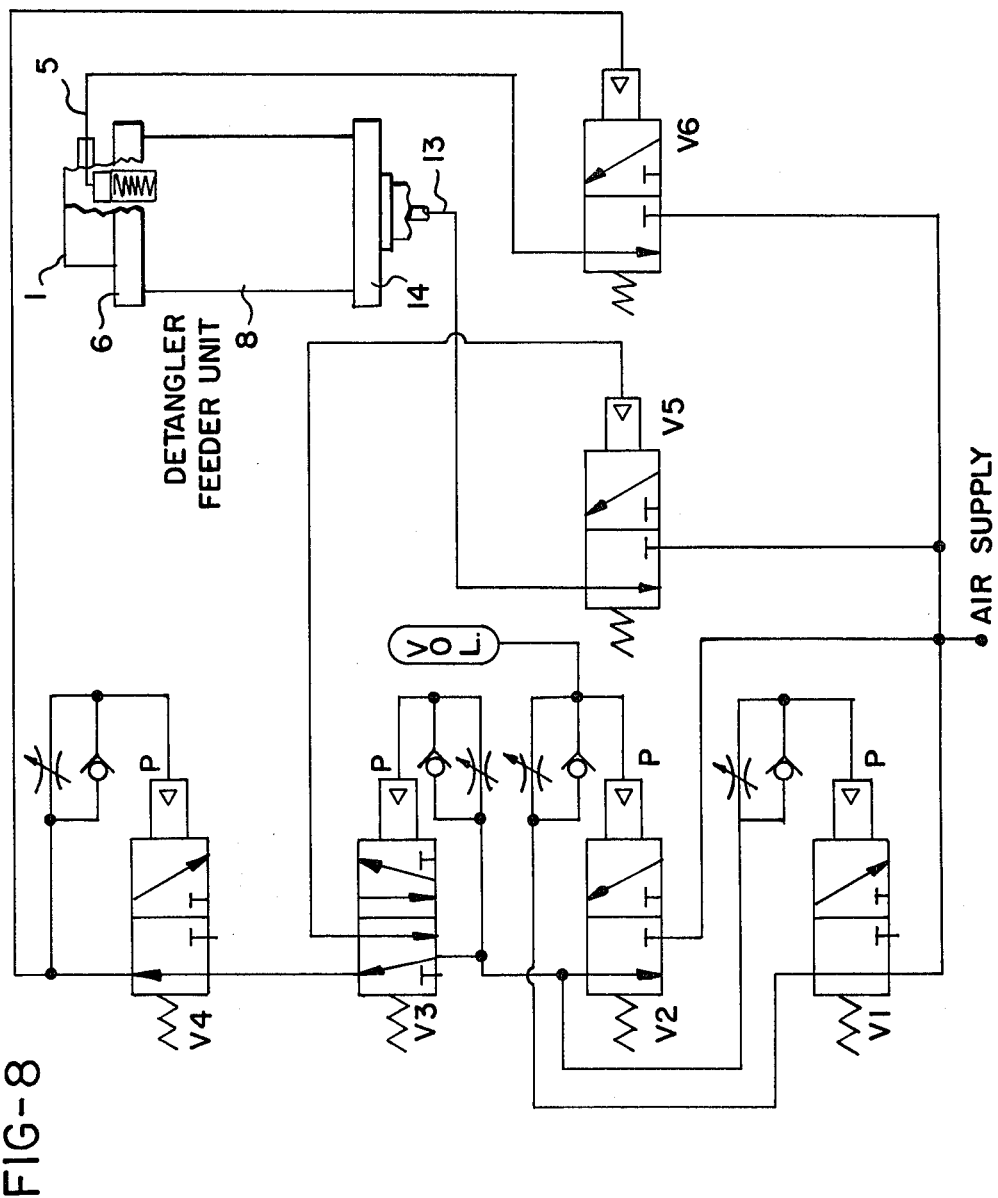
FIG. 8 is a pneumatic schematic view, illustrating the pneumatic control and supply arrangement of the present invention.

Reference is now made to FIG. 8, illustrating the pneumatic supply means of the present invention. V1, V2, and V4 are air piloted 3-way spring return valves, each of which incorporates an integral adjustable flow control. V3 is an air piloted 4-way spring return valve with an integral adjustable flow control. V5 and V6 are air piloted 3-way spring return valves. V2 is connected to a volume chamber or accumulator. All valves are shown in FIG. 8 in their normal position, with no air applied to the circuit.

The valves perform the following functions:

1. V1 regulates total "on" time.
2. V2 regulates "off" time between cycles.
3. V3 divides V1 "on" time by actuating V4 and V5 in the proper ratio.
4. V4 provides a variable frequency pulsating output to V6.

The operation of the pneumatic supply means is as follows. With air applied to the circuit, air passes to V5 and V6 whose ports are blocked (N/C). Air also passes through V1 and to V2 flow control where pressure bleeds through to fill the volume chamber. When sufficient pressure has built up in the volume chamber, V2 shifts and directs air to the flow control of V1 and the inlet and flow control of V3.

Air passes through V3 to V4 at this time and to V6 which shifts and applies air to the shedder piston. Next, air bleeding across the flow control of V4 causes V4 to shift and exhaust all pressure, allowing the spring to return this valve to normal. Likewise, the same occurs at V6. This entire process is repeated several times in rapid sequence which causes V4 to oscillate. During the time that V4 oscillates, air bleeding across the flow control of V3 builds up in pressure which is eventually great enough to cause V3 to shift and apply pressure to V5 pilot. V5 shifts and directs air to the air inlet 13 in lower end of the casing 8.

Since the time at which V2 first shifted, air has been bleeding across the flow control at V1 which has now become sufficient enough to shift V1. V1 exhausts all pressure from V1 and V2 pilots, causing both to return to their normal positions and thus ending the cycle.

Various modifications to the present invention may be made. For example, it should be noted that the primary reason for the volume chamber at V2 is to provide for an extended "off" period. If no such "off" period is required, the volume chamber may be eliminated. It will be appreciated that multiple spring outlet openings, connected to multiple output conduits may be provided where desired.

While the form of apparatus herein described constitutes a preferred embodiment of the invention, it is to be understood that the invention is not limited to this precise form of apparatus, and that changes may be made therein without departing from the scope of the invention.

What is claimed is:

1. A device for supplying helical wire compression springs in sequence to an output conduit, comprising:
   casing means defining a spring supply chamber therein for receiving a plurality of helical wire compression springs of a first diameter, a delivery tube mounted on top of said casing, defining a spring outlet opening of a diameter slightly larger than said first diameter, said delivery tube communicating through said spring outlet opening between said chamber and said output conduit, agitator means, including an air inlet communicating with the bottom of said chamber, for supplying air under pressure to said chamber such that springs in said chamber are agitated and pass out of said chamber through said delivery tube and into said output conduit, and shedder piston means surrounding said spring outlet opening of said delivery tube and movable with respect thereto so as to dislodge springs entangled within or blocking said spring outlet opening.

2. The device of claim 1 in which said shedder piston means comprises a shedder piston surrounding said delivery tube and movable with respect thereto, and spring means biasing said piston upward into a dispensing position in which the lower end of said piston surrounds said spring outlet opening, and in which said device further includes pneumatic supply means for supplying air under pressure to the top of said shedder piston to cause said piston to move downward from said dispensing position so as to dislodge springs blocking said spring outlet opening of said delivery tube, and for supplying air under pressure to said air inlet.

3. The device of claim 2 in which said delivery tube defines a beveled exterior surface surrounding said spring outlet opening, and in which said shedder piston defines an internally beveled surface, the clearance between said externally beveled surface and said internally beveled surface when said shedder piston is in its dispensing position being less than the thickness of the wire forming said springs, whereby a spring may not become lodged between said externally beveled surface and said internally beveled surface when said shedder piston is in its dispensing position.

4. The device of claim 2 in which said pneumatic supply means includes a pressurized air supply source, means for directing air from said supply source to said air inlet for a selected portion of an operating cycle of said device and for directing air to the top of said shedder piston for the balance of the operating cycle of said device, and means for repetitively interrupting the supply of air to the top of said shedder piston, whereby said shedder piston repeatedly moves downward from said dispensing position.

5. The device of claim 1 in which said chamber has a downwardly converging, generally conical floor and in which said agitator means includes a deflector for directing air from said air inlet along said floor, whereby springs in said chamber are thoroughly agitated.

6. The device of claim 1 in which the top of said chamber is defined by surfaces converging toward said spring outlet opening, whereby springs which strike the top of said chamber are deflected toward said spring outlet opening.

* * * * *